(12) United States Patent
Wako

(10) Patent No.: US 6,484,094 B1
(45) Date of Patent: Nov. 19, 2002

(54) DISPLAY METHOD AND APPARATUS FOR NAVIGATION SYSTEM

(75) Inventor: Hikaru Wako, Redondo Beach, CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 10/078,131

(22) Filed: Feb. 19, 2002

(51) Int. Cl.⁷ ............................................. G01C 21/36
(52) U.S. Cl. .................... 701/211; 701/207; 701/708; 701/209; 340/988; 340/995; 340/990
(58) Field of Search ................................ 701/201, 207, 701/208, 209, 211; 340/988, 990, 995

(56) References Cited

U.S. PATENT DOCUMENTS 5,179,385 A    1/1993  O'Loughlin et al.
5,825,306 A  * 10/1998  Higokawa et al. .......... 340/988
5,832,408 A  * 11/1998  Tamai et al. ................ 701/208
6,374,180 B1   4/2002  Slominski et al.

* cited by examiner

*Primary Examiner*—Richard M. Camby
(74) *Attorney, Agent, or Firm*—Muramatsu & Associates (57) ABSTRACT

A display method and apparatus for navigation system for specifying the destination easily and quickly. The navigation system is designed to enable a user to quickly select a POI (Point of Interest) through a set of POIs specially made by a user or by the system. The navigation system includes a "Favorite POI" menu created based on user's preference or frequency of use and/or "Last POI" created based on most recent use. The user can directly select a POI through the "Favorite POI" or "Last POI". Since this process does not require a long list of category and sub-category or page scrolling, the user can easily and quickly select the destination.

20 Claims, 7 Drawing Sheets

| Dest | Find Destination By |
|---|---|
| ○ | Address    ○ Intersection |
| ◉ | Point of Interest |
| ○ | Phone Number |
| ○ | Latitude / Longitude |
| ○ | Previous Destinations |
| ○ | Address Book |
| ○ | Today's Plan          5 |

Fig. 3B    ↓Enter  ↑Cancel

| Dest | Find Point of Interest By |
|---|---|
| | Place Name |
| | Place Type |

Fig. 3C    ↓Enter  ↑Cancel

| Dest | Select Category |
|---|---|
| | ATM |
| | AUTOMOTIVE |
| | BANK |
| | EMERGENCY |
| | GAS STATION |
| | RESTAURANT |

Fig. 3D    ↓Enter  ↑Cancel

| Dest | Select Category |
|---|---|
| | AMERICAN |
| | CALIFORNIAN |
| | CHINESE |
| | ITALIAN |
| | JAPANESE |
| | KOREAN |

Fig. 3E    ↓Enter  ↑Cancel

| Dest | Find Place By |
|---|---|
| | Sort by Distance |
| | Name |
| | Within a City |

Fig. 3F    ↓Enter  ↑Cancel

| Dest | Select Name |
|---|---|
| | CURRY HOUSE |
| | TAIKO |
| | KITAYAMA |
| | BENIHANA OF TOKYO |
| | GENKAI |
| | SUSHI MASA |

Fig. 3G    ↓Enter  ↑Cancel

| Dest | Confirm Route |
|---|---|
| | TAIKO |
| | 14775 Jeffery Rd. |
| | Irvine, CA 92618 |
| | (949) 559-7190 |
| | By Quickest Route Method |
| | OK to Proceed |
| | Options |

Fig. 3H

Calculating

| Dest | Find Destination By |
|---|---|
| ○ Address | ○ Intersection |
| ◉ Point of Interest | |
| ○ Phone Number | |
| ○ Latitude / Longitude | |
| ○ Previous Destinations | |
| ○ Address Book | |
| ○ Today's Plan | 5 |

Fig. 6B

| Dest | Point of Interest By |
|---|---|
| | Place Name |
| ◁ Last 7 | Place Type |
| Favorite POI | ATM |
| | Restaurant (Japanese) |
| | Restaurant (BBQ/Southern) |

Fig. 6C

| Dest | Select Category |
|---|---|
| Restaurant (Italian) | |
| ATM | |
| Gas Station | |
| Restaurant (Japanese) | |
| Restaurant (American) | |
| Bank | |
| Golf Course | |

Fig. 6D

| Dest | Find Point of Interest By |
|---|---|
| | Place Name |
| ◁ Last 7 | Place Type |
| Favorite POI | ATM |
| | Restaurant (Japanese) |
| | Restaurant (BBQ/Southern) |

Fig. 6E

| Dest | Find Place By |
|---|---|
| Restaurant (Japanese) | |
| Sort By Distance | |
| Name | |
| ◁ Last 7 | Within a City |

Fig. 7A

| Setup | Display Setup |
|---|---|
| Brightness: | +10 |
| Display: | Auto Color |
| POI Icon: | Hide |
| Exit Icon: | Hide |
| Favorite POI: | Frequently use / Custom |
| Orientation: | Heading Up |
| Trait: | Recording Off |

Setup | Select Favorite POI ■□□□□

- ☐ AIRPORT
- ☐ AMUSEMENT PARK
- ☑ ATM
- ☐ AUTO SVC & MAINT
- ☐ AUTOMOBILE CLUB
- ☐ BANK
- ☐ BUSINESS FACILITIES

Done / Reset 74, 78, 72, 73, 75

Fig. 7C

Setup | Select Favorite POI ■■□□□

- ☐ AIRPORT
- ☐ AMUSEMENT PARK
- ☑ ATM
- ☐ AUTO SVC & MAINT
- ☐ AUTOMOBILE CLUB
- ☐ BANK
- ☐ BUSINESS FACILITIES

Done / Reset

Fig. 7D

Setup | Select Favorite POI ■□□□□

- ☐ RECREATION
- ☐ RENTAL CAR AGENCY
- ☐ REST AREA
- ☐ RESTAURANT
- ☐ SCHOOL
- ☐ SHOPPING
- ☐ SPORTS COMPLEX

Done / Reset 73, 74, 72, 75, 78

Fig. 7E

Dest | Select Type of Food ■□□□□

- ☐ ALL TYPES
- ☐ AFRICAN
- ☐ AMERICAN
- ☐ BBQ / SOUTHERN
- ☐ BISTRO
- ☐ BREWPUB
- ☐ BRITISH / ISLES

Done / Reset 77, 74, 72, 76, 78

Fig. 7F

Setup | Select Type of Food ■■□□□

- ☐ ALL TYPES
- ☐ AFRICAN
- ☑ AMERICAN
- ☐ BBQ / SOUTHERN
- ☐ BISTRO
- ☐ BREWPUB
- ☐ BRITISH / ISLES

Done / Reset

Fig. 7G

Setup | Select Type of Food ■■■□□

- ☐ ALL TYPES
- ☐ AFRICAN
- ☑ AMERICAN
- ☑ BBQ / SOUTHERN
- ☐ BISTRO
- ☐ BREWPUB
- ☐ BRITISH / ISLES

Done / Reset

DISPLAY METHOD AND APPARATUS FOR NAVIGATION SYSTEM

FIELD OF THE INVENTION

This invention relates to a display method and apparatus for navigation system for route guiding to the destination, and more particularly, to a display method and apparatus which is capable of easily and quickly specifying a destination in the navigation system when using a "Point of Interest (POI)" method by having a user pre-established set of POIs.

BACKGROUND OF THE INVENTION

A vehicle navigation system performs vehicle travel guidance for enabling a driver to easily drive the vehicle to a selected destination. Such a navigation system detects the position of the vehicle, reads out map data pertaining to an area at the vehicle current position from a data storage medium, for example, a CD-ROM (compact disk read-only memory) or a DVD (digital versatile disc), and displays a map image on a monitor screen (display) while superposing a mark representing the current location of the vehicle on a predetermined portion of the map image.

The vehicle position is determined by a self-contained navigation sensors (e.g. a distance traveled sensor and a bearing sensor) mounted in the vehicle or by a global positioning system (GPS) including an artificial satellite (satellite navigation). The satellite enables absolute position detection and higher position accuracy than the self-contained navigation sensors. However, the satellite navigation involves problem of position detection failure such as in a tunnel or a building where the satellite radio signals are obstructed. Therefore, recent navigation systems utilize both self-contained navigation and satellite navigation to achieve improved performances.

As the present position of the vehicle changes with the travel of the vehicle, the vehicle current position mark in the map image on the screen is changed accordingly. Alternatively, the map is scrolled while the vehicle current position mark is fixed at a predetermined position, for example, at the center of the image. In either methods, the navigation system enables the driver to recognize the map information of the area at the vehicle position at a glance.

When a destination is not set, such a navigation system functions as a locator map which indicates the current location of the vehicle on a map image. When the destination is set, the navigation system starts a route guidance function for setting a guided route from the starting point to the destination. Typically, the route guidance function performs an intersection guidance process in which a monitor screen displays an enlarged intersection diagram and the direction in which the vehicle is to travel while displaying the guide route on a map. When a destination is input, a CPU in the navigation system determines a most suitable guided route from the current vehicle position to the destination and successively stores nodes (expressed in longitude and latitude) constituting the guided route in a memory.

During actual traveling, the node series stored in the memory is searched for a portion of the guided route to be displayed in a map display area of the monitor screen, and the portion of the guided route is highlighted so as to be discriminable from other routes. When the vehicle is within a predetermined distance of an intersection it is approaching, an intersection guidance diagram (an enlarged or highlighted intersection diagram with an arrow indicating the direction in which the vehicle is to turn at the intersection) is displayed to inform a driver of the desired one of roads or directions selectable at the intersection.

Figure 1A:
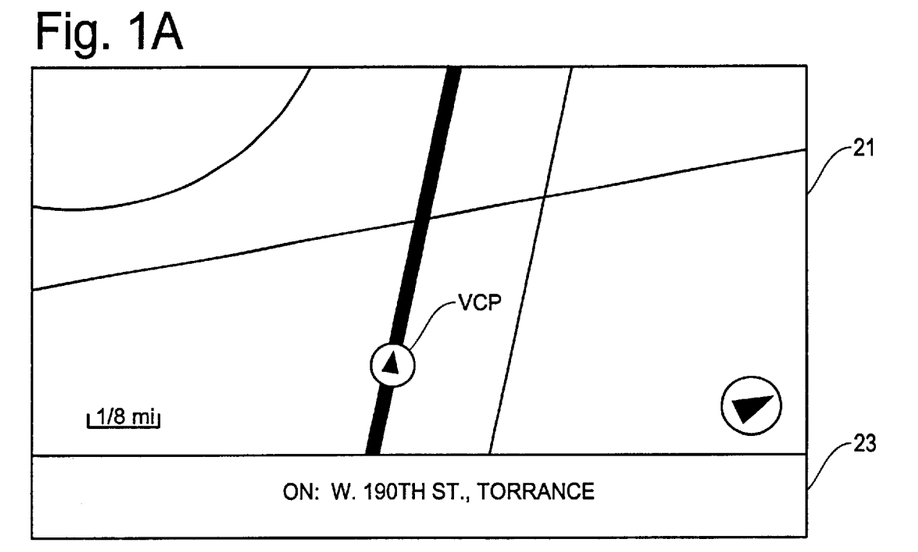
FIGS. 1A and 1B are schematic diagrams showing an example of locator map display and route guidance display, respectively, of a navigation system.

FIG. 1A shows an example of a locator map display containing a vehicle current position mark VCP on a map image 21. Typically, a navigation system shows the street on which the vehicle is running in the map image 21 and a name of the street such as "W 190TH ST" in an information box 23 on the monitor screen. Other information such as a north pointer NP, a map scale and a current time may also be illustrated on the display screen. In this manner, the locator map display shows the current position of the vehicle on the map image, however, it does not perform the route guidance function because the destination is not set in the navigation system.

Figure 1B:
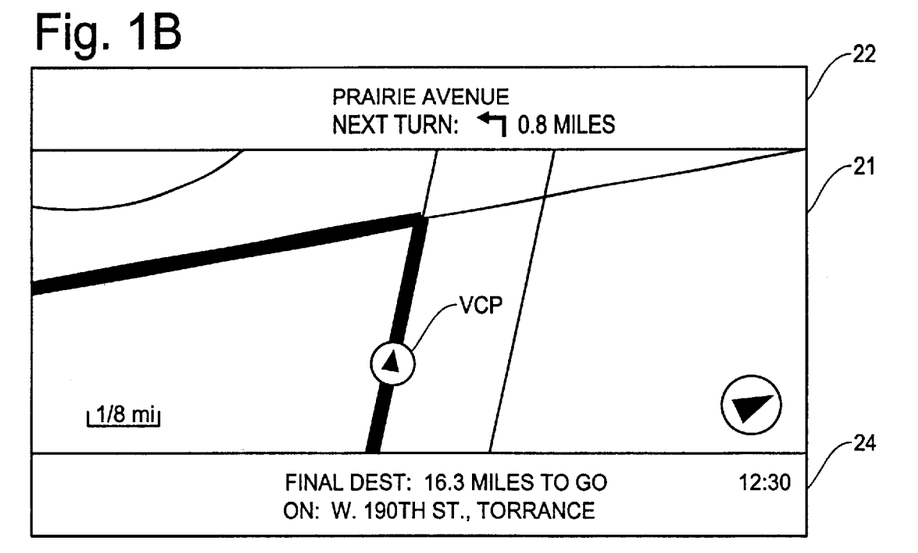

FIG. 1B shows an example of route guidance display which performs the route guidance function. The route guidance display is activated after specifying the destination. In addition to the map image 21 similar to the locator map of FIG. 1A, this example further shows an arrow indicating the direction (left) in which the vehicle is to turn at the intersection in a guidance information box 22 at the top of the screen. The guidance information box 22 also shows a name of the street "PRAIRIE AVE" which intersects with the current street "W 190TH ST" and a distance to the intersection. Thus, the navigation system indicates that the vehicle should make a left turn at the intersection with "PRAIRIE AVE".

Typically, the current street "W 190TH ST" and the left side of the street "PRAIRIE AVE" will be highlighted in the map image 21. Further, such route guidance is accompanied by voice instructions. If the direction of travel in the next intersection is left, the navigation system gives spoken guidance such as "turn left at the next intersection". In this example, an information box 24 at the bottom of the display screen includes information regarding the remaining distance to the final destination and an estimated time to reach the final destination.

In order to be guided by the route guidance mode such as shown in FIG. 1B, a destination must be specified in the navigation system so that the system can find one or more routes to get to the destination. Navigation systems today provide a variety of ways to specify the destination. A brief example of process for specifying the destination is shown in FIGS. 2A–2C.

Figure 2A:
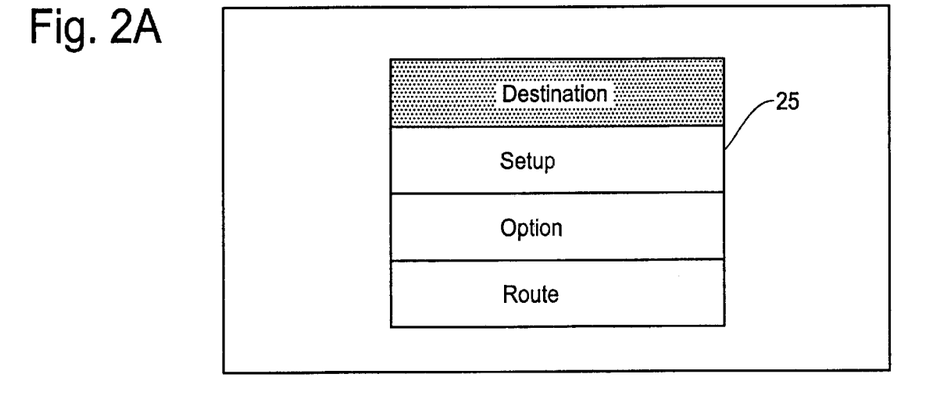
FIGS. 2A–2C are schematic diagrams showing an example of display screen incorporated in the operation of a vehicle navigation system.

By operating a menu key, a main menu screen 25 such as shown in FIG. 2A is displayed on the navigation system and a menu item "Destination" is selected from the main menu. This allows the navigation system to display an "Enter Destination by" screen 27 as shown in FIG. 2B for specifying an input method for selecting the destination. The "Enter Destination by" screen 27 lists various methods for selecting the destination including "Address" for specifying the city and address of the destination, "Intersection" for specifying the names of two streets in the city which intersect with one another, and "Point of Interest" for selecting the programmed destination based on the name, category or telephone number.

Other methods in the "Enter Destination by" screen 27 include "Recent Route" for specifying the destination based on the recent destinations saved in the navigation system, "Address Book" for selecting the address of the destination out of the addresses stored in the system, and "Map Cursor" for specifying the destination by pointing a cursor to the destination on the map. For example, the information in the address book is formed of a list of names and addresses of the places that a user frequently visits.

Figure 2B:
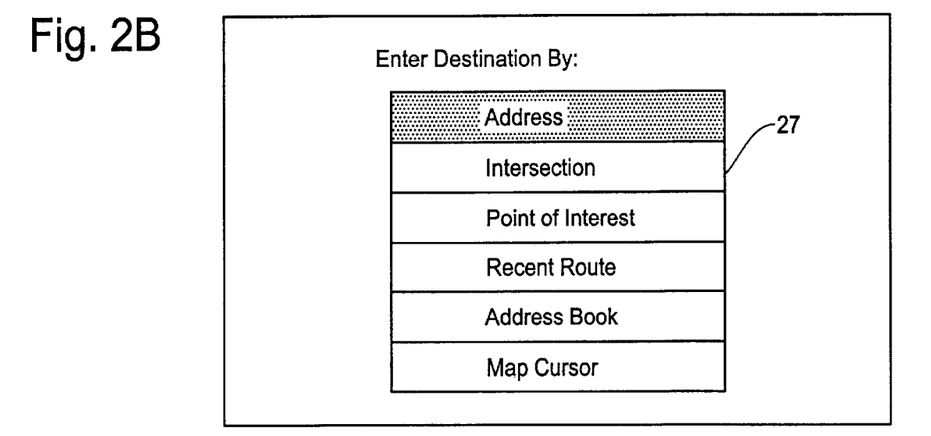
Figure 2C:
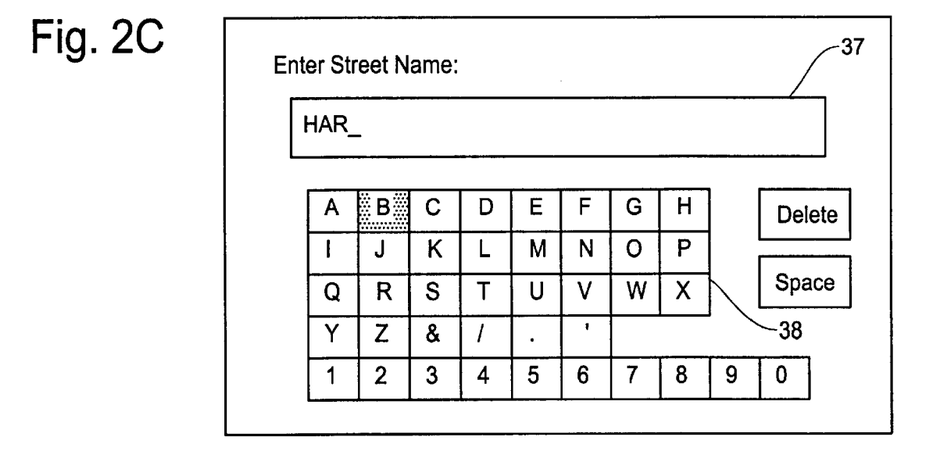

When selecting, for example, the "Address" in FIG. 2B, the navigation system displays an "Enter Street Name" screen such as shown in FIG. 2F. The screen of FIG. 2F is basically a key board 38 for inputting the city and address in an address input box 37 on the monitor screen. The user inputs the street name and number in the address input box 37 through the key board 38.

After inputting the destination, the navigation system determines a route to the destination based on, for example, the shortest way to reach the destination, the route using many free ways as possible or the route without using toll road, and the like. Thus, the navigation system moves to the route guidance display such as shown in FIG. 1B which performs the route guidance.

This invention is directed to a display method and apparatus for a navigation system using the input method of "Point of Interest" noted above. Although the "Point of Interest" process is convenient and useful, because the recent storage medium provides a large volume of data involving this input method, it requires relatively many steps to finalize inputting the destination. Typically, the process of specifying a destination through the "Point of Interest" is carried out in the following manner with reference to FIGS. 3A–3F.

Figure 3A:
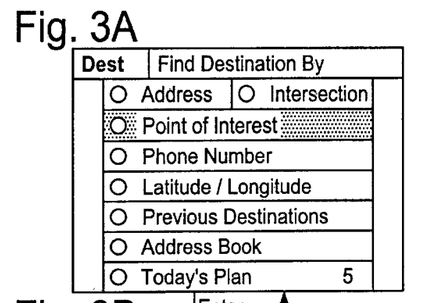
FIGS. 3A–3H are schematic diagrams of display example showing a process of specifying the destination in the navigation system with use of a "Point of Interest (POI)" input method in the conventional technology.

In the example of FIGS. 3A–3F, it is assumed that an intended destination is a Japanese restaurant "Taiko" in Irvine, Calif. FIG. 3A shows an example of screen listing the various input methods noted above for selecting the destination. As shown in this example, typically, the navigation display lists several items, such as up to seven or eight items per page as a maximum number. Therefore, when the number of items exceeds the maximum number, it is usually necessary to scroll the display to see the other items outside of the current screen.

Figure 3B:
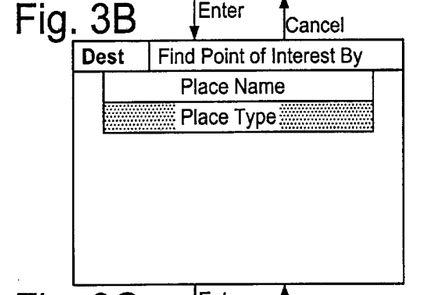

In FIG. 3A, by selecting the "Point of Interest" and hitting an enter key, the navigation system displays a screen shown in FIG. 3B for finding the point of interest by either place names or place types. As shown in this example, this screen typically lists only two items. In FIG. 3B, by selecting the "Place Type" and pressing the enter key, the navigation system displays a screen shown in FIG. 3C for selecting the categories of the point of interest. This screen lists various different categories of point of interest such as "ATM", "Automotive", "Bank", "Restaurant", "Hotel", "Shopping" and others. Typically, the number of such categories are as many as forty or more. Therefore, in many cases, such a category list must be scrolled to find a favorite place type on the screen.

Figure 3C:
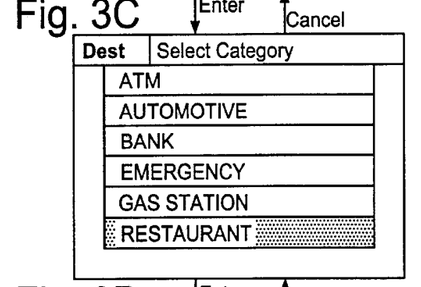

By selecting the category type "Restaurant" in FIG. 3C, the navigation system displays another category select screen listing sub-categories of the selected category. In this case, the sub-category screen shows types of food such as "American", "Californian", "Chinese", "French", "Italian", "Japanese", "Korean" and etc. Sometimes, such a sub-category list extends to several pages, requiring page scrolling to find a favorite sub-category.

Figure 3D:
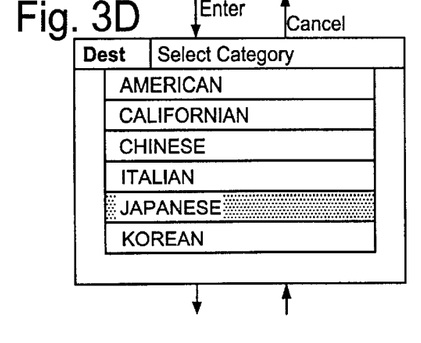
Figure 3E:
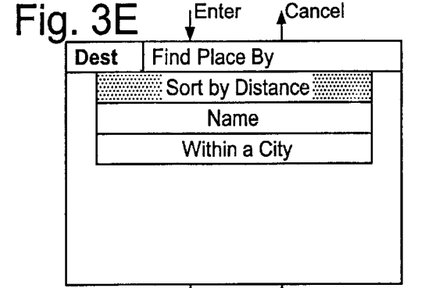

By selecting the sub-category "Japanese" and pressing the enter key in FIG. 3D, the navigation system displays a screen for selecting a method of finding the places as shown in FIG. 3E. In this example, the methods include "Sort by Distance", "Name" and "Within a city". The "Sort by Distance" method is to find the places, Japanese restaurants, in this case, in the order of distance from the vehicle current position. The "Name" method is to find the places by inputting the name of the Japanese restaurant through, for example, a key board. The "Within a City" method is to list the places, i.e., Japanese restaurants, within the city where the vehicle is located.

Figure 3F:
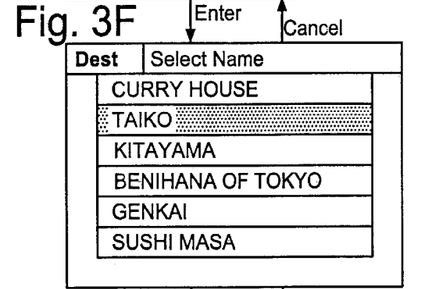

By selecting the "Sort by Distance" and hitting the enter key in FIG. 3E, the navigation system displays a list of Japanese restaurants in the order of distance from the current vehicle position as shown in FIG. 3F. The screen of FIG. 3F is to select one of the names in the list. In the case where two or more restaurants having the same name exist, such restaurants will be listed in the order of the distance from the vehicle position.

Figure 3G:
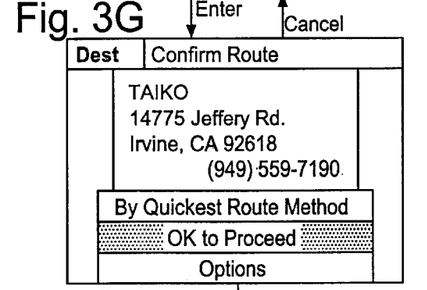

The user selects the name "Taiko" in FIG. 3F and presses the enter key. Then, the navigation system displays a confirmation route screen such as shown in FIG. 3G for confirming the destination. The screen of FIG. 3G shows the name, address and phone number of the selected destination. Although not shown in the example of FIG. 3G, such a confirmation screen may also show a distance to the destination, an anticipated time length to reach the destination, and a direction to the destination.

Figure 3H:
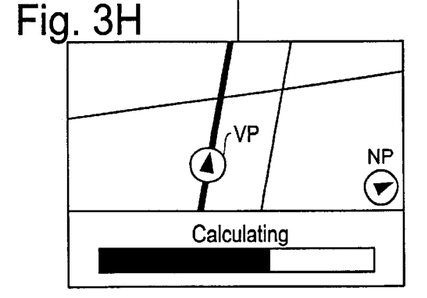

By selecting "OK to Proceed" in FIG. 3G, the navigation system calculates the optimum route to the destination in FIG. 3H. The navigation system determines the route to the destination based on, for example, the shortest way to reach the destination, the route using many freeways as possible or the route without using toll road, and the like. During this process, the navigation system shows a progress of calculation by a bar graph as shown in the lower part of FIG. 3H. Then, the navigation system moves to the route guidance display such as shown in FIG. 1B which performs the route guidance.

As described in the foregoing, the process of specifying the destination by the "Point of Interest" requires many steps of key operation. Especially, the category list includes a large number of POI categories and sub-categories, or even sub-categories of the sub-category, which requires to scroll the category screen to locate the intended category. Thus, the search method of "Point of Interest" requires a relatively long time to finally specifying the destination, which may adversely affect the safe driving. Therefore, there is a need for a navigation system which can easily and quickly specify the destination through the "Point of Interest" method.

SUMMARY OF THE INVENTION

It is, therefore, an object of the present invention to provide a navigation system which enables a user to easily and quickly specifies a destination in the navigation system when using a "Point of Interest" method.

In this invention, the navigation system is designed to enable a user to quickly select a destination through a POI (Point of Interest) method by having a pre-established set of POIs, i.e., "Favorite POI". Namely, the navigation system includes a new menu item "Favorite POI" for short cutting the process of selecting the category and sub-category of the intended destination. After selecting the input method "Point of Interest", the navigation system displays the "Favorite POI" menu along with other traditional menus. When selecting the "Favorite POI", the navigation system displays a predetermined number of POIs which are pre-registered manually by a user or automatically by the navigation system.

More specifically, the method of the present invention includes the steps of: forming a set of points of interest (POI) listing a predetermined number of POIs (Favorite POI) selected based on user's preference or automatically by the navigation system based on a predetermined rule; displaying a list of destination input methods and selecting a "Point of Interest" menu; displaying a "Point of Interest" screen for selecting a method of searching a point of interest wherein the "Point of Interest" screen includes a "Favorite POI" menu; selecting the "Favorite POI" menu and displaying the list of predetermined number of "Favorite POI" for selecting a category of POI; and selecting one of the categories of POI in the "Favorite POI" and specifying a destination in the selected category of the "Favorite POI".

Each of the POIs in the list of "Favorite POI" indicates a category or a combination of a category and sub-category of the selected POI. The step of forming the "Favorite POI" includes a step of selecting a category or a combination of higher category and lower category of POI preferred by a user through a system setup process provided in the navigation system.

The predetermined rule for automatically forming the list of "Favorite POI" by the navigation system is an order of frequent use of same POI or an order of recent use of POIs. Alternatively, in the step of forming the list of POIs, the list is automatically determined by the navigation system based on an order of most recently used POIs ("Last POI").

The display method further includes a step of confirming the selected destination by displaying detailed information on the selected destination. The display method further includes a step of determining an appropriate route to the selected destination and displaying a route guidance screen for guiding a user to reach the selected destination.

Another aspect of the present invention is a display apparatus for a vehicle navigation system. The display apparatus is configured by various means for achieving the display methods described above which utilizes the list of "Favorite POI" menu and/or "Last POI" menu.

According to the present invention, the vehicle navigation system enables the user to enter the destination easily and quickly through the "Point of Interest" input method. First, the user selects the "Point of Interest" input method, then selects the "Favorite POI" or "Last POI" which causes to display pre-established list of POIs. Since this process does not require a long list of category and sub-category or page scrolling of the category or sub-category list, the user can easily and quickly specify the destination in the navigation system.

BRIEF DESCRIPTION OF THE INVENTION

DETAILED DESCRIPTION OF THE INVENTION

The present invention will be described in detail with reference to the accompanying drawings. The navigation system of the present invention is designed to enable a user to quickly specify the destination when using the "Point of Interest (POI)" input method. In accordance with the present invention, a user is able to quickly specify the destination through the POI input method with use of a custom made POI list such as a "Favorite POI" or previously used POIs such as a "Last POI".

Examples of operation process and display screen incorporated in the present invention are shown in FIGS. 6A–6E. FIGS. 7A–7G show the process and display examples for setting the custom made POI list of the present invention through, for example, a system setup process.

Figure 4:
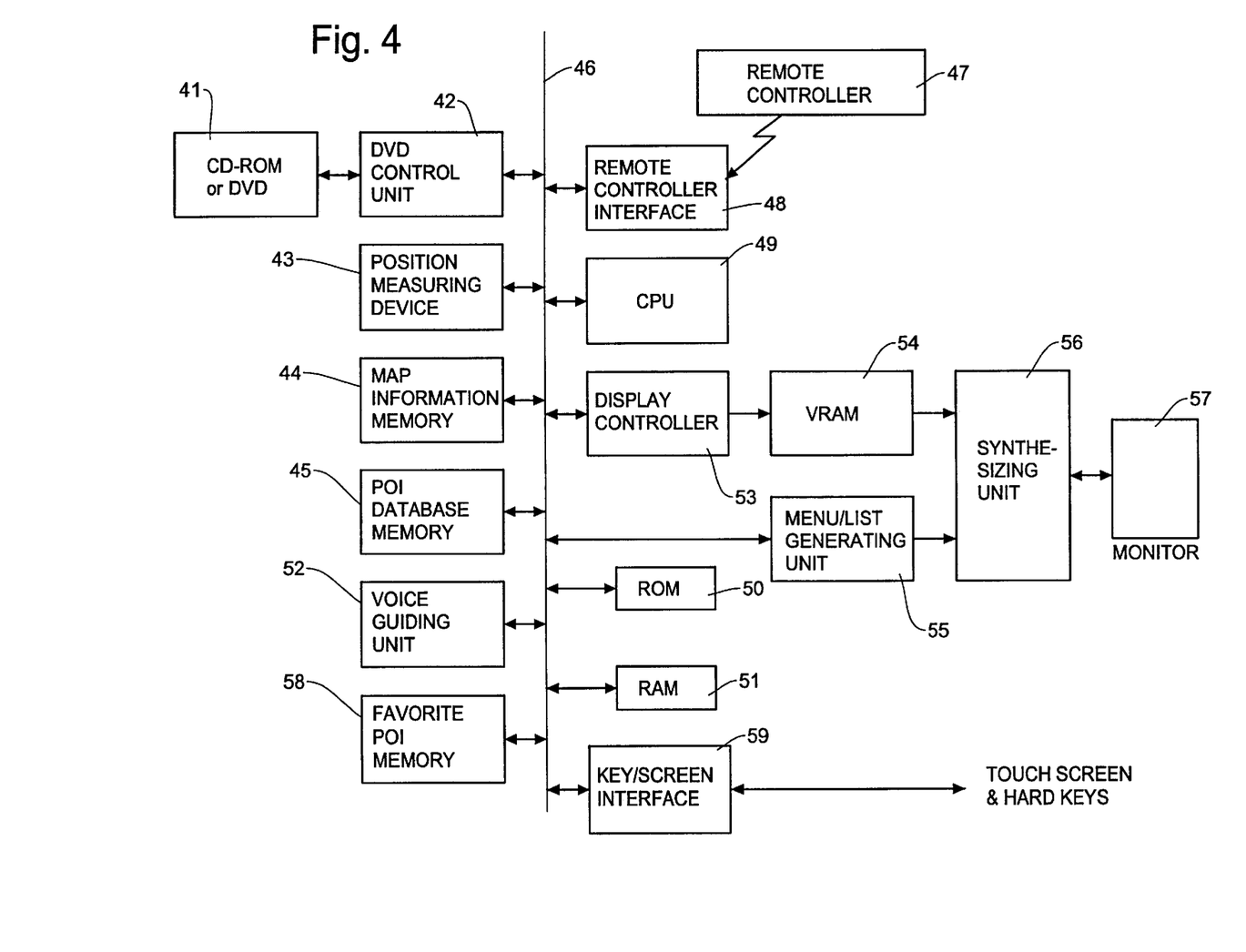
FIG. 4 is a block diagram showing an example of structure in the vehicle navigation system according to the present invention.
Figure 5A:
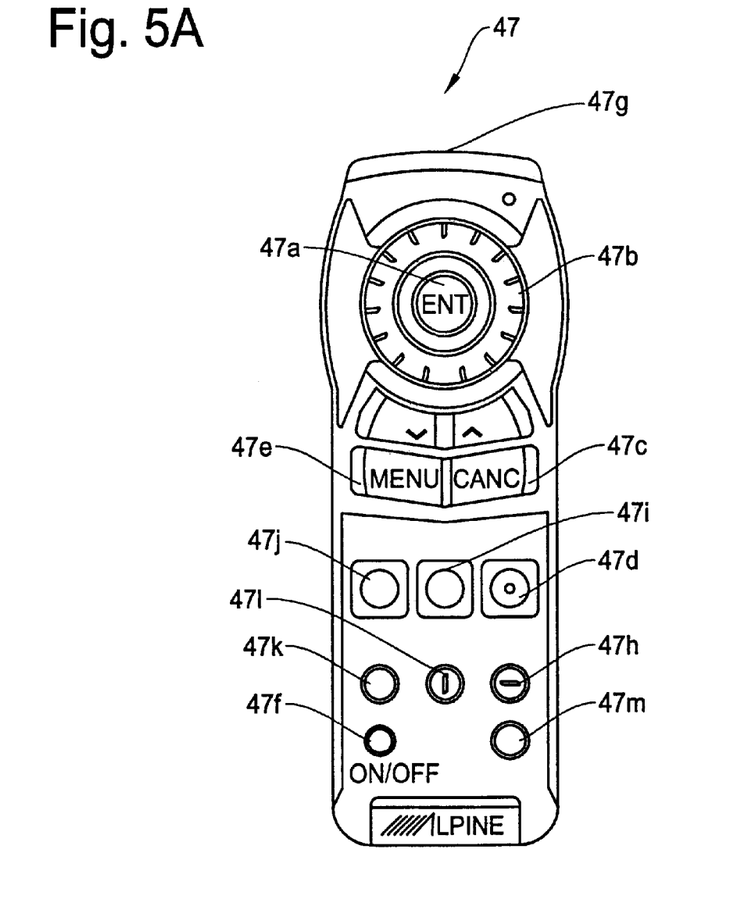
FIGS. 5A and 5B are diagrams showing an example of a remote controller accompanied by the vehicle navigation system of the present invention.
Figure 5B:
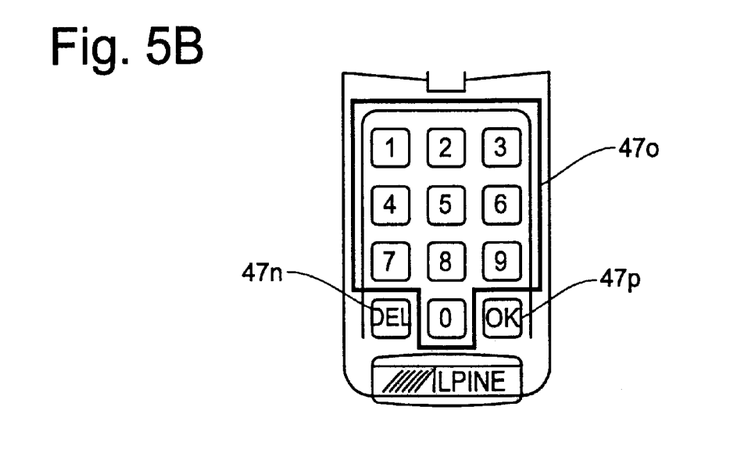

Before going into details of the display examples of FIGS. 6A–6E, a brief description is made regarding the basic structure of the navigation system with reference to the block diagram of FIG. 4 and an example of remote controller for the navigation system with reference to FIGS. 5A and 5B.

In the block diagram of FIG. 4, the navigation system includes a map storage medium 41 such as a CD-ROM, DVD, hard disc or other storage means (hereafter "DVD") for storing map information, a DVD control unit 42 for controlling an operation for reading the map information from the DVD, a position measuring device 43 for measuring the present vehicle position. The position measuring device 43 has a vehicle speed sensor for detecting a moving distance, a gyro for detecting a moving direction, a microprocessor for calculating a position, a GPS receiver, and etc.

The block diagram of FIG. 4 further includes a map information memory 44 for storing the map information which is read out from the DVD 41, a database memory 45 for storing database information such as point of interest (POI) information which is read out from the DVD 41, a remote controller 47 for executing a menu selection operation, an enlarge/reduce operation, a destination input operation, etc. and a remote controller interface 48.

The remote controller 47 has a variety of function keys as shown in FIG. 5A and numeric keys as shown in FIG. 5B. The numeric keys appear when a lid in the lower part of FIG. 4A is opened. The remote controller 47 includes a joystick/enter key 47a, a rotary encoder 47b, a cancel key 47c, an MP/RG key 47d, a menu key 47e, a zoom/scroll key 47e, a monitor ON/OFF key 47f, a remote control transmitter 47g, a plan key 47h, an N/H key 47i, a voice key 47j, a list key 47k, a detour key 47l, a delete destination key 47m, a delete key 47n, numeric keys 47o, and an OK key 47p.

The joystick/enter key 47a selects highlighted items within the menu and moves map displays and a vehicle position icon. The rotary encoder 47b changes zoom scale, scrolls list pages, moves the cursor, and etc. The cancel key 47c cancels the present displayed screen or is operated when returning the screen to the previous menu screen. The MP/RG key 47d toggles between detailed map display and basic guide display during guidance. The menu key 47e displays the main menu. The plan key 47h deletes the route set by Today's Plan function, the N/H key 47i changes between North-up and Heading-up orientation, and the voice key 47j initiates voice instruction.

Although a remote controller such as described above is a typical example for selecting menus, executing selected functions and etc., the navigation system includes various other input methods to achieve the same and similar operations done through the remote controller. For example, the navigation system includes hard keys and a joystick on a head unit of the navigation system mounted on a dash board, touch screen of the display panel, and voice communication means.

Referring back to FIG. 4, the navigation system further includes a bus 46 for interfacing the above units in the system, a processor (CPU) 49 for controlling an overall operation of the navigation system, a ROM 50 for storing various control programs such as a route search program and a map matching program necessary for navigation control, a RAM 51 for storing a processing result such as a guide route, a voice interface and guiding unit 52 for voice communication interface and spoken instructions, a display controller 53 for generating map images (a map guide image and an arrow guide image) on the basis of the map information, a VRAM 54 for storing the images generated by the display controller, a menu/list generating unit 55 for generating menu image/various list images, a synthesizing unit 56 for synthesizing images from the VRAM 54 and the menu/list generating unit 55, a monitor (display) 57, a favorite POI memory 58 for storing a user pre-established set of POIs in accordance with the present invention, and a key and screen interface 59 for interfacing with various other input means such as hard keys and joystick on a display panel of the navigation system or a touch screen of the navigation system, and the like.

With reference to FIGS. 6A–6E and FIGS. 7A–7G, in the present invention, the destination is specified with use of the POI (Point of Interest) input method. FIGS. 6A–6E show display examples and operational processes in the navigation system of the present invention. FIGS. 7A–7G show display examples and process for setting the custom made POI list such as "Favorite POI" of the present invention in the navigation system. It should be noted that, within the context of this invention, an operation of the key, such as pressing the enter key, means any execution of the same or similar function such as by the remote controller, a key on a navigation system panel, a touch screen, or through a voice communication.

Figure 6A:
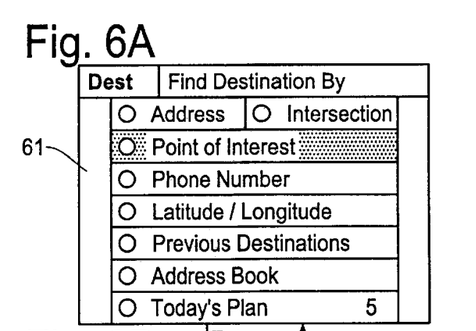
FIGS. 6A–6E are schematic diagrams showing display examples in the navigation system of the present invention for specifying the destination using the "Point of Interest" input method.

FIG. 6A shows an example of screen 61 for listing the various input methods for selecting the destination, which is the same as that shown in FIG. 3A. In this example, the destination is specified starting from the input method selection screen of the navigation system. By selecting the "Point of Interest" and pressing the enter key, the navigation system of the present invention displays a "Find Point of Interest by" screen 62 shown in FIG. 6B. The screen 62 is to find the point of interest by either place names or place types like the prior art example shown in FIG. 3B.

Figure 6B:
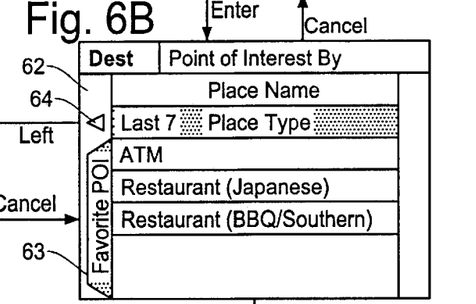

However, unlike the example of FIG. 3B, the screen 62 shown in FIG. 6B additionally includes a "Favorite POI" menu for finding the POI based on pre-registered POIs and a "Last 7" menu (alternatively, "Last POI" menu) in the "Place Type" menu. In this example, the "Favorite POI" menu lists pre-registered categories of POIs such as "ATM" and "Restaurant (Japanese)". Therefore, without selecting the "Place Type" as required in the conventional example of FIG. 3B, the user can directly select the "Restaurant (Japanese)" in FIG. 6D.

Figure 6C:
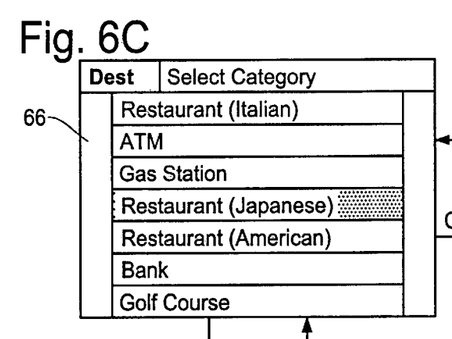
Figure 6D:
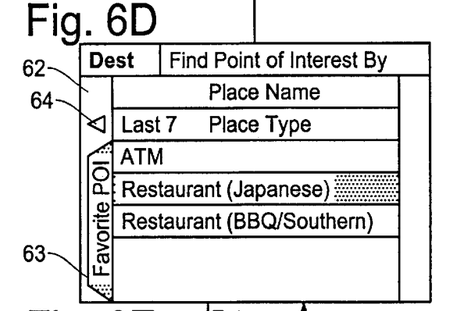
Figure 6E:
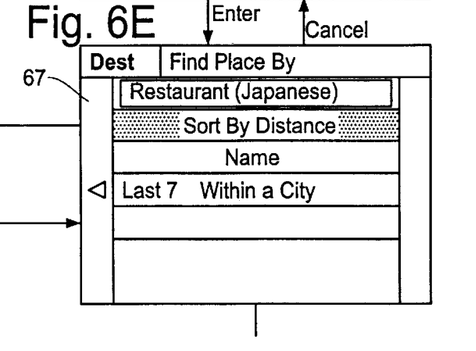

One of the features of the "Favorite POI" in the present invention is that the pre-registered category identifies both the category (restaurant) and the sub-category (Japanese food) of the POIs. In other words, with use of the "Favorite POI" menu of the present invention, the user can directly select the sub-category of Japanese restaurant. Namely, the steps shown in FIGS. 3C and 3D in the prior art technology are obviated in the navigation system of the present invention. In the next step, the user selects the method of listing the Japanese restaurant such as by "Sorted by Distance", "Name", or "Within the City" through a "Find Place by" screen 67 such as shown in FIG. 6E. Then, the same process shown in FIGS. 3F–3H will follow before the route guidance starts.

Alternatively, instead of the category and sub-category relationship, it is also possible to arrange so that three or more layers of category and sub-categories can be specified by one POI. For example, there is a case where the POI category "Restaurant" in the above example has a POI sub-category "Japanese" as one of types of food, and the "Japanese" food has a POI sub-category "Sushi" as one of types of Japanese food. In other words, the POI category is structure in three layers (category, sub-category, subcategory of subcategory). To directly specify the POI in the lowest category, in this case, a display example of the favorite POI for such a case will be "Restaurant (Japanese Sushi)".

In the screen 62 of FIG. 6B, the "Place Type" menu includes the "Last 7" menu. This function is to show the recently selected seven POI categories saved in the navigation system. For example, when the arrow mark 64 in the left is pressed by, for example, tilting the joystick left, the navigation system displays the most recently used seven POI categories. Such an example is shown in FIG. 6C where seven different POI categories are displayed on a "Select Category" screen 66. By selecting the "Restaurant (Japanese)", the navigation system moves to the "Find Place by" screen 67 of FIG. 6E to select the method of listing the places as noted above.

In either the "Favorite POI" menu or the "Last 7" menu noted above, the pre-registration of the category is made by manually by a user or automatically by the navigation system. For example, a user will determine the categories and sub-categories or further lower categories of his "Favorite POI" based on his preference through a system setup process of the navigation system. Alternatively, the navigation system automatically detects the frequently used categories and sub-categories and establishes the "Favorite POI" based on the order of the frequency of selection. With respect to the "Last 7" ("Last POI") menu, since the navigation system stores the history of its operation, it can detect and list the most recently used categories and sub-categories and display the combination of category and sub-category such as shown in FIG. 6C.

FIGS. 7A–7G show an example of process for creating the list of "Favorite POI" through the system setup. Most navigation systems today provide a system setup menu for setting various parameters and functions. Typically, such a system setup function is conducted through a main menu of the navigation system such as shown in FIG. 2A. It is assumed that by selecting the setup menu in the main menu and by further selecting a display setup menu in the setup screen (not shown), the navigation system displays a display setup screen 71 shown in FIG. 7A.

Figure 7A:
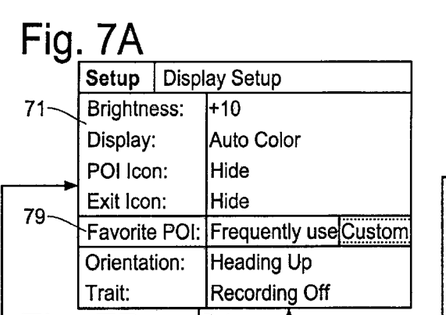
FIGS. 7A–7G are schematic diagrams showing an example of process for creating a list of customized POIs in the "Favorite POI" menu incorporated in the present invention described with reference to FIGS. 6A–6E.

In the present invention, the display setup menu includes a "Favorite POI" setup function 79 along with other display functions. In the example of FIG. 7A, the "Favorite POI" setup function 79 includes selection of a "Frequently Use" menu and a "Custom" menu. When the "Frequently Use" menu is selected, the navigation system checks the history of usage regarding the frequency of same destinations and establishes a set of favorite POIs formed of most frequently used POIs.

For creating a customized "Favorite POI", a user selects the "Custom" menu on the "Display Setup" screen 71 in FIG. 7A. By pressing the enter key, the navigation system displays a "Select Favorite POI" screen 75 shown in FIG. 7B. The screen 75 lists all of the POI categories in, for example, an alphabetic order. The screen 75 also shows a number marker 73 for indicating the number of favorite POIs that have been selected, a scroll key 72 for up-down scrolling the list of POIs, a "Done" key 74 for finalizing the selection and a "Reset" key 78 for cancelling the selection.

Figures 7B, 7E:
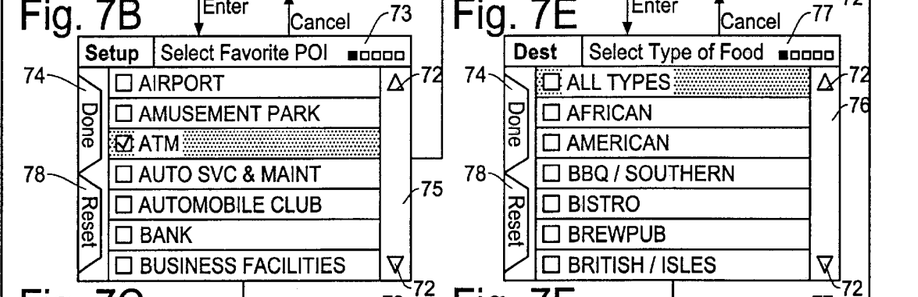
Figures 7C, 7F:
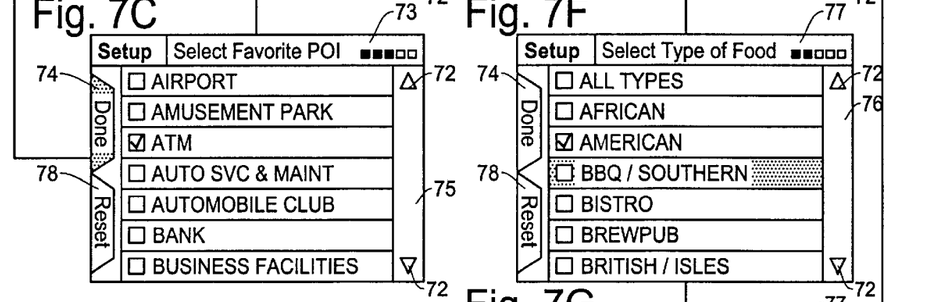

Suppose the user wants to select "ATM" as one of the favorite POIs, he selects the "ATM" on the screen 75 and executes the "Done" key 74 as shown in FIG. 7C. This process is repeated in the example of FIGS. 7B and 7C until reaching the predetermined maximum number of the favorite POIs, such as five. In the case when five categories are already selected, the other items in the list are grayed, for example, and unavailable. In this example, the number of favorite POIs already selected is shown by the number marker 73 and the selected POIs are shown by check marks on the screen 75. When the "Reset" key 78 is executed, the check marks are disappeared and all of the categories become available.

Figure 7D:
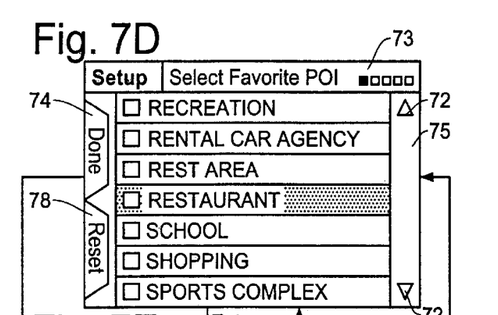

In the "Select Favorite POI" screen 75, when the selected favorite POI has sub-categories, the navigation system provides a process for selecting the sub-categories associated with the selected category. FIG. 7D shows a case when the "Restaurant" is selected as a favorite POI. Since the category "Restaurant" includes sub-categories indicating the types of food, when pressing the enter key, the navigation system moves to a "Select Type of Food" screen 76 as shown in FIG. 7E.

Figure 7G:
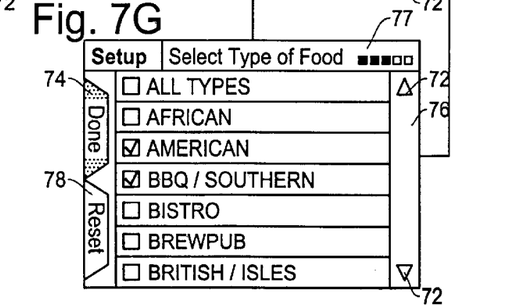

Thus, the user can specify the sub-category of the restaurant on the screen 76 in a manner similar to FIGS. 7B and 7C noted above. Such a process is shown in FIGS. 7E–7G in which the screen 76 includes a number marker 77 indicating the number of selected sub-categories, a scroll key 72 for up-down scrolling the list of sub-categories, a "Done" key 74 for executing the selection and a "Reset" key 78 for cancelling the selection. Similar process can also be used in the case where the POI category is structure by three or more layers of categories, such as category, subcategory, sub-category of sub-category, etc.

Suppose the user wants to select the American food as a sub-category, he selects "American" on the screen 76 in FIG. 7F and execute the "Done" key 74 as shown in FIG. 7G. The user repeats this process to select all of his favorite sub-categories. In this example, the number of favorite sub-categories already selected is shown by the number marker 77 and the selected sub-categories are shown by check marks on the screen 76. In the case when the maximum number of sub-categories are selected, the other items in the list are grayed, for example, and unavailable. When the "Reset" key 78 is executed, the check marks are disappeared and all of the items become available.

As has been described above, according to the present invention, the vehicle navigation system enables the user to enter the destination easily and quickly through the "Point of Interest" input method. First, the user selects the "Point of Interest" input method, then selects the "Favorite POI" or "Last POI" which causes to display pre-established list of POIs. Since this process does not require a long list of category and sub-category or page scrolling of the category or sub-category list, the user can easily and quickly specify the destination in the navigation system.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A display method for a navigation system, comprising the following steps of:

forming a set of points of interest (POI) listing a predetermined number of POIs (Favorite POI) selected based on user's preference or automatically by the navigation system based on a predetermined rule;

displaying a list of destination input methods and selecting a "Point of Interest" menu;

displaying a "Point of Interest" screen for selecting a method of searching a point of interest wherein the "Point of Interest" screen includes a "Favorite POI" menu;

selecting the "Favorite POI" menu and displaying the list of predetermined number of "Favorite POI" for selecting a category of POI; and selecting one of the categories of POI in the "Favorite POI" and specifying a destination in the selected category of the "Favorite POI".

2. A display method for a navigation system as defined in claim 1, wherein each of said POIs in said list of said "Favorite POI" indicates at least one category of the selected POI.

3. A display method for a navigation system as defined in claim 1, wherein each of said POIs in said list of said "Favorite POI" indicates a category and one or more lower layers of category of the selected POI.

4. A display method for a navigation system as defined in claim 1, wherein said predetermined rule for automatically forming said list of "Favorite POI" by the navigation system is an order of frequent use of same POI or an order of recent use of POIs.

5. A display method for a navigation system as defined in claim 1, further comprising a step of confirming the selected destination by displaying detailed information on the selected destination.

6. A display method for a navigation system as defined in claim 1, further comprising a step of determining an appropriate route to the selected destination and displaying a route guidance screen for guiding a user to reach the selected destination.

7. A display method for a navigation system as defined in claim 1, wherein said step of forming the "Favorite POI" includes a step of selecting a category or a combination of a category and one or more lower layers of category of POI preferred by a user through a system setup process provided in the navigation system.

8. A display method for a navigation system, comprising the following steps of:

forming a set of points of interest (POI) listing a predetermined number of POIs (Last POI) selected automatically by the navigation system based on an order of recent use of POIs;

displaying a list of destination input methods and selecting a "Point of Interest" menu;

displaying a "Point of Interest" screen for selecting a method of searching a point of interest wherein the "Point of Interest" screen includes a "Last POI" menu;

selecting the "Last POI" menu and displaying a list of the predetermined number of "Last POI" for selecting a category of POI; and selecting one of the categories of POI in the "Last POI" and specifying a destination in the selected category of the "Last POI".

9. A display method for a navigation system as defined in claim 8, wherein each of said POIs in said list of said "Last POI" indicates at least one category of the selected POI.

10. A display method for a navigation system as defined in claim 8, wherein each of said POIs in said list of said "Last POI" indicates a category or a combination of a category and one or more lower layers of category of the selected POI.

11. A display method for a navigation system as defined in claim 8, further comprising a step of confirming the selected destination by displaying detailed information on the selected destination.

12. A display method for a navigation system as defined in claim 8, further comprising a step of determining an appropriate route to the selected destination and displaying a route guidance screen for guiding a user to reach the selected destination.

13. A display method for a navigation system as defined in claim 8, wherein said step of forming the "Favorite POI" includes a step of selecting a category and a sub-category of POI preferred by a user through a system setup process provided in the navigation system.

14. A display apparatus for a navigation system, comprising:
   means for forming a set of points of interest (POI) listing a predetermined number of POIs (Favorite POI) selected based on user's preference or automatically by the navigation system based on a predetermined rule;
   means for displaying a list of destination input methods and selecting a "Point of Interest" menu;
   means for displaying a "Point of Interest" screen for selecting a method of searching a point of interest wherein the "Point of Interest" screen includes a "Favorite POI" menu;
   means for selecting the "Favorite POI" menu and displaying the list of predetermined number of "Favorite POI" for selecting a category of POI; and
   means for selecting one of the categories of POI in the "Favorite POI" and specifying a destination in the selected category of the "Favorite POI".

15. A display apparatus for a navigation system as defined in claim 14, wherein each of said POIs in said "Favorite POI" list indicates a category or a combination of a category and one or more lower layers of the selected POI.

16. A display apparatus for a navigation system as defined in claim 14, wherein said predetermined rule for automatically forming said list of "Favorite POI" by the navigation system is an order of frequent use of same POI or an order of recent use of POIs.

17. A display apparatus for a navigation system as defined in claim 14, wherein said list of predetermined number of POI is automatically determined based on an order of most recently used POIs ("Last POI") by the navigation system.

18. A display apparatus for a navigation system as defined in claim 14, further comprising means for confirming the selected destination by displaying detailed information on the selected destination.

19. A display apparatus for a navigation system as defined in claim 14, further comprising means for determining an appropriate route to the selected destination and displaying a route guidance screen for guiding a user to reach the selected destination.

20. A display apparatus for a navigation system as defined in claim 14, said means for forming the "Favorite POI" includes means for selecting a category and a sub-category of POI preferred by a user through a system setup process provided in the navigation system.

* * * * *